(12) United States Patent
Hibino

(10) Patent No.: US 11,046,121 B2
(45) Date of Patent: Jun. 29, 2021

(54) TIRE

(71) Applicant: Sumitomo Rubber Industries, Ltd., Kobe (JP)

(72) Inventor: Atsushi Hibino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 499 days.

(21) Appl. No.: 15/937,164

(22) Filed: Mar. 27, 2018

(65) Prior Publication Data

US 2018/0281529 A1 Oct. 4, 2018

(30) Foreign Application Priority Data

Mar. 30, 2017 (JP) .............................. JP2017-067118

(51) Int. Cl.
| | | |
|---|---|---|
| *B60C 11/11* | (2006.01) | |
| *B60C 11/12* | (2006.01) | |
| *B60C 11/13* | (2006.01) | |
| *B60C 11/03* | (2006.01) | |

(52) U.S. Cl.
CPC ...... *B60C 11/1204* (2013.01); *B60C 11/0306* (2013.01); *B60C 11/11* (2013.01); *B60C 11/12* (2013.01); *B60C 11/1236* (2013.01); *B60C 11/1353* (2013.01); *B60C 2011/0346* (2013.01); *B60C 2011/1209* (2013.01); *B60C 2011/1213* (2013.01); *B60C 2011/1231* (2013.01); *B60C 2200/06* (2013.01)

(58) Field of Classification Search
CPC ..... B60C 11/11; B60C 11/1353; B60C 11/12; B60C 11/1204; B60C 11/1236; B60C 2011/1231
See application file for complete search history.

(56) References Cited

U.S. PATENT DOCUMENTS

2019/0092100 A1\* 3/2019 Takata ................ B60C 11/0306

FOREIGN PATENT DOCUMENTS

| EP | 0711676 A1 | | 5/1996 |
|---|---|---|---|
| JP | 11-286204 A | \* | 10/1999 |
| JP | 2000-255220 A | \* | 9/2000 |
| JP | 2010-137662 A | \* | 6/2010 |

(Continued)

OTHER PUBLICATIONS

Machine translation for Japan 2010-137662 (Year: 2020).\*

(Continued)

*Primary Examiner* — Steven D Maki
(74) *Attorney, Agent, or Firm* — Birch, Stewart, Kolasch & Birch, LLP

(57) ABSTRACT

A tire comprises a tread portion 2. The tread portion 2 comprises a plurality of blocks each comprising a first longitudinal edge 18 and a second longitudinal edge 19 extending in a tire circumferential direction, and a ground contacting surface defined therebetween. The blocks include a first block 20 having a first narrow groove 21 provided in the ground contacting surface thereof. The first narrow groove 21 extends from a first end 21*a* on the first longitudinal edge 18 toward a center 24 in a tire axial direction of the first block 20 and curves within the ground contacting surface and reaches a second end 21*b* on the first longitudinal edge 18 so as to extend in a laterally oriented V-shape.

18 Claims, 9 Drawing Sheets

(56) References Cited

FOREIGN PATENT DOCUMENTS

JP          5739862 B2     6/2015
WO      WO-95/18022 A1 *  7/1995

OTHER PUBLICATIONS

Machine translation for Japan 2000-255220 (Year: 2020).*
Machine translation for Japan 11-286204 (Year: 2020).*
Extended European Search Report for Application No. 18163941.0, dated Jul. 10, 2018.

* cited by examiner

TIRE

TECHNICAL FIELD

The present invention relates to a tire having improved wet performance and uneven wear resistance performance.

BACKGROUND ART

Japanese Patent No. 5739862 (Patent Literature 1) has proposed a tire having a plurality of blocks in a tread portion. The tire of Patent Literature 1 is provided with narrow grooves each completely crossing a ground contacting surface of corresponding one of the blocks in order to improve the wet performance.

Unfortunately, the narrow grooves decrease rigidity of the blocks, therefore, they are likely to cause uneven wear of the blocks.

In particular, in the blocks of the tire of Patent Literature 1, large ground contact pressure is likely to be applied to lateral edges extending in a tire axial direction, therefore, so-called heal and toe wear tends to occur.

SUMMARY OF THE INVENTION

The present invention was made in view of the above, and a primary object thereof is to provide a tire having improved wet performance and uneven wear resistance performance.

In one aspect of the present invention, a tire comprises a tread portion comprising a plurality of blocks, wherein each of blocks comprises a first longitudinal edge and a second longitudinal edge extending in a tire circumferential direction, and a ground contacting surface defined therebetween, the blocks include a first block having a first narrow groove provided in the ground contacting surface thereof, and the first narrow groove extends from a first end on the first longitudinal edge toward a center in a tire axial direction of the first block and curves within the ground contacting surface and reaches a second end on the first longitudinal edge so as to extend in a laterally oriented V-shape.

In another aspect of the invention, it is preferred that the first block has a second narrow groove provided in the ground contacting surface thereof, the second narrow groove extends from a third end on the second longitudinal edge toward the center in the tire axial direction of the first block and curves within the ground contacting surface and reaches a fourth end on the second longitudinal edge so as to extend in the laterally oriented V-shape, and the first narrow groove and the second narrow groove are arranged so as not to intersect with each other.

In another aspect of the invention, it is preferred that each of the first narrow groove and the second narrow groove is curved before the center.

In another aspect of the invention, it is preferred that the first narrow groove includes a first inclined element extending from the first end toward the center and being inclined with respect to the tire axial direction, a second inclined element extending from the second end and being inclined in a direction opposite to the first inclined element, and an apex portion smoothly connecting between the first inclined element and the second inclined element.

In another aspect of the invention, it is preferred that each of the first inclined element and the second inclined element extends straight.

In another aspect of the invention, it is preferred that an angle between the first inclined element and the second inclined element is in a range of from 70 to 140 degrees.

In another aspect of the invention, it is preferred that the first longitudinal edge has a first vertex convex toward the outside of the first block, and the first vertex is provided between the first end and the second end.

In another aspect of the invention, it is preferred that the second narrow groove includes a third inclined element extending from the third end toward the center and being inclined with respect to the tire axial direction, a fourth inclined element extending from the fourth end and being inclined in a direction opposite to the third inclined element, and an apex portion smoothly connecting between the third inclined element and the fourth inclined element.

In another aspect of the invention, it is preferred that each of the third inclined element and the fourth inclined element extends straight.

In another aspect of the invention, it is preferred that an angle between the third inclined element and the fourth inclined element is in a range of from 70 to 140 degrees.

In another aspect of the invention, it is preferred that the second longitudinal edge has a second vertex convex toward the outside of the first block, and the second vertex is provided between the third end and the fourth end.

In another aspect of the invention, it is preferred that each of the first narrow groove and the second narrow groove has an apex portion at a part thereof closest to the center, and the apex portion of the second narrow groove is provided at a different position in the tire circumferential direction from the apex portion of the first narrow groove.

In another aspect of the invention, it is preferred that the blocks include at least two first blocks arranged adjacently to each other in the tire axial direction with a circumferential groove extending in the tire circumferential direction therebetween, and the second narrow groove of one of the two first blocks is arranged so as to be connected with the first narrow groove of the other one of the two first blocks with the circumferential groove therebetween.

In another aspect of the invention, it is preferred that the first blocks are crown blocks.

In another aspect of the invention, it is preferred that the circumferential groove includes a first groove portion and a second groove portion having different groove depths.

In another aspect of the invention, it is preferred that the first narrow groove includes a first inclined element extending from the first end toward the center and being inclined with respect to the tire axial direction, a second inclined element extending from the second end and being inclined in a direction opposite to the first inclined element, and an apex portion smoothly connecting between the first inclined element and the second inclined element, and a distance L3 in the tire axial direction between the first vertex of the first longitudinal edge and an end of the apex portion on a side of the center is in a range of from 0.10 to 0.40 times a maximum width W5 in the tire axial direction of the first block.

In another aspect of the invention, it is preferred that a groove width of the first narrow groove is in a range of from 0.5 to 3.0 mm.

In another aspect of the invention, it is preferred that a groove depth of the first narrow groove is in a range of from 0.5 to 3.5 mm.

DESCRIPTION OF THE PREFERRED EMBODIMENT

An embodiment of the present invention will now be described in conjunction with accompanying drawings.

Figure 1:
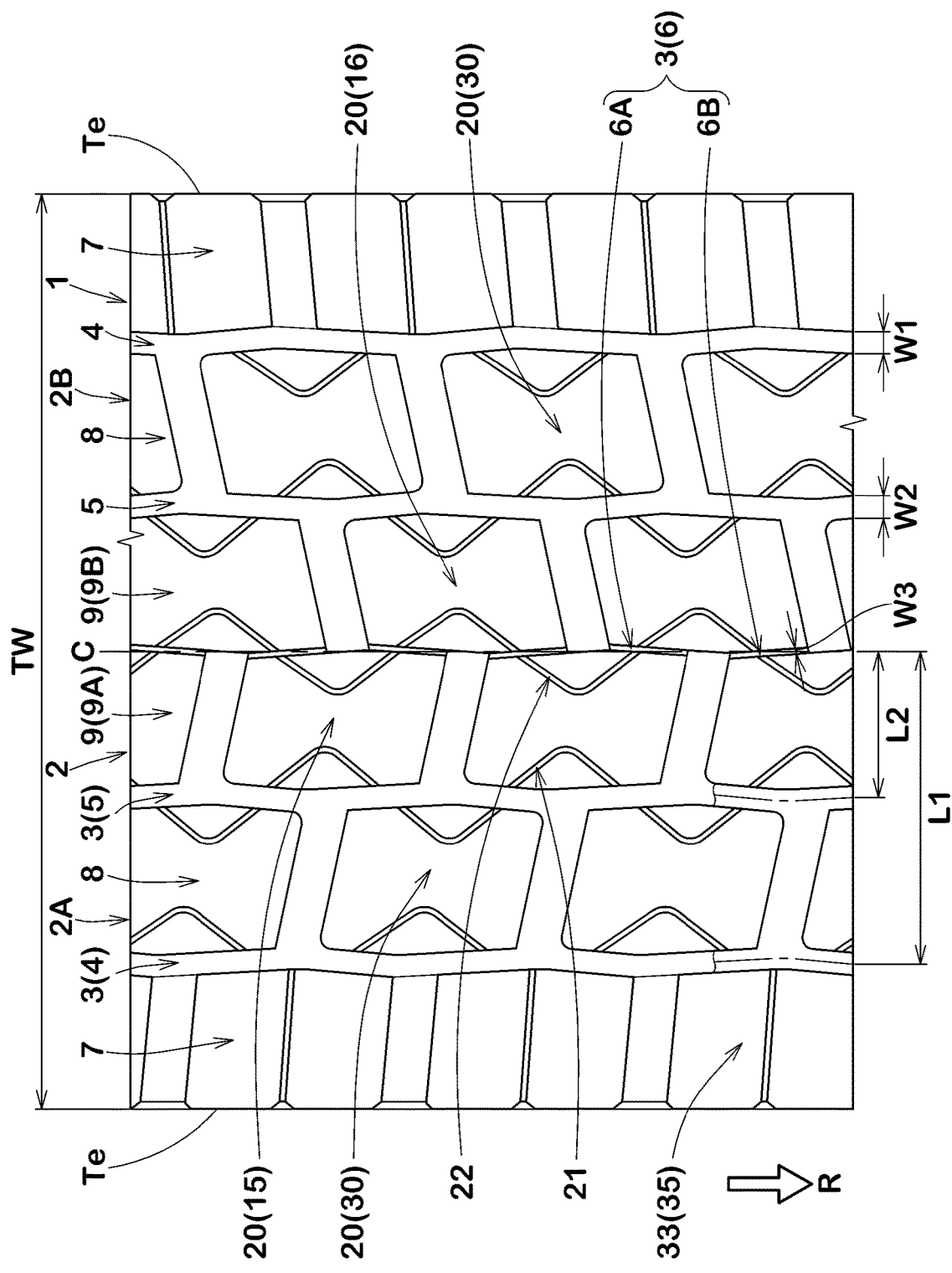
FIG. 1 is a development view of a tread portion of a tire according to an embodiment of the present invention.

FIG. 1 is a development view of a tread portion 2 of a tire 1 according to an embodiment of the present invention. As shown in FIG. 1, the tire 1 in this embodiment is suitably used as a pneumatic tire for heavy load, for example. In another embodiment of the present invention, the tire 1 can be used as a tire for a passenger car, a non-pneumatic tire not filled with pressurized air thereinside, or the like, for example.

The tire 1 in this embodiment has a directional pattern bound with an intended tire rotational direction R, for example. The tire rotational direction R is indicated on a sidewall portion (not shown) with characters or the like, for example.

The tread portion 2 is provided with a plurality of circumferential grooves 3 extending in a tire circumferential direction, for example.

The circumferential grooves 3 include shoulder main grooves 4 and crown main grooves 5 extending continuously in the tire circumferential direction, for example. The shoulder main grooves 4 are each provided closest to respective one of tread edges Te, for example. The crown main grooves 5 are each provided between respective one of the shoulder main grooves 4 and a tire equator C, for example.

In a case of a pneumatic tire, the tread edges Te are defined as outermost ground contacting positions in a tire axial direction of the tire 1 when the tire 1 in a standard state is in contact with a flat surface with zero camber angle by being loaded with a standard tire load. The standard state is a state in which the tire 1 is mounted on a standard rim, inflated to a standard pressure, and loaded with no tire load. In this specification, dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

In this embodiment, each of a first tread portion 2A defined between one of the tread edges Te and the tire equator C and a second tread portion 2B defined between the other one of the tread edges Te and the tire equator C is provided with one shoulder main groove 4 and one crown main groove 5.

It is preferred that, in each of the shoulder main grooves 4, a distance L1 in the tire axial direction between a groove center line thereof and the tire equator C is in a range of from 0.30 to 0.35 times a tread width TW, for example. It is preferred that, in each of the crown main grooves 5, a distance L2 in the tire axial direction between a groove center line thereof and the tire equator C is in a range of from 0.10 to 0.20 times the tread width TW, for example. The tread width TW is a distance in the tire axial direction between the tread edges Te in the standard state.

It is preferred that the shoulder main grooves 4 and the crown main grooves 5 each extend in a zigzag manner in the tire circumferential direction, for example.

It is preferred that the shoulder main grooves 4 and the crown main grooves 5 respectively have groove widths W1 and W2 in a range of from 2.0% to 4.0% of the tread width TW, for example. In the case of a pneumatic tire for heavy load, it is preferred that each of the shoulder main grooves 4 and the crown main grooves 5 has a groove depth in a range of from 20 to 25 mm, for example. The shoulder main grooves 4 and the crown main grooves 5 configured as such can improve steering stability on a dry road surface and the wet performance in a good balance.

The circumferential grooves 3 in this embodiment include a crown longitudinal narrow groove 6 arranged between two crown main grooves 5, for example. The crown longitudinal narrow groove 6 has a groove width W3 smaller than that of each of the crown main grooves 5, for example. Specifically, it is preferred that the groove width W3 of the crown longitudinal narrow groove 6 is in a range of from 1.0 to 3.0 mm, for example. Further, the crown longitudinal narrow groove 6 has a groove depth in a range of from 20 to 25 mm, for example. In a preferred embodiment, the crown longitudinal narrow groove 6 has the same groove depth as that of each of the crown main grooves 5.

The crown longitudinal narrow groove 6 includes first crown longitudinal narrow groove portions 6A and second crown longitudinal narrow groove portions 6B which are inclined in opposite directions to each other, for example. The first crown longitudinal narrow groove portions 6A and the second crown longitudinal narrow groove portions 6B are arranged alternately in the tire circumferential direction, for example.

It is preferred that the first crown longitudinal narrow groove portions 6A and the second crown longitudinal narrow groove portions 6B have different groove depths from each other. It is preferred that each of the first crown longitudinal narrow groove portions 6A in this embodiment has the groove depth in a range of from 0.40 to 0.60 times the groove depth of each of the crown main grooves 5, for example. It is preferred that each of the second crown longitudinal narrow groove portions 6B has the groove depth in a range of from 0.80 to 1.00 times the groove depth of each of the crown main grooves 5, for example. The first crown longitudinal narrow groove portions 6A and the second crown longitudinal narrow groove portions 6B configured as such can improve the steering stability and the wet performance on a dry road surface in a good balance.

The tread portion 2 in this embodiment is divided into shoulder land regions 7, middle land regions 8, and a crown land region 9 by the circumferential grooves 3 described above. Each of the shoulder land regions 7 is defined between one of the shoulder main grooves 4 and its adjacent one of the tread edges Te, for example. Each of the middle land regions 8 is defined between one of the shoulder main grooves 4 and its adjacent one of the crown main grooves 5, for example. The crown land region 9 is defined between the two crown main grooves 5. The shoulder land regions 7 and the middle land regions 8 are arranged one by one in each of the first tread portion 2A and the second tread portion 2B.

Figure 2:
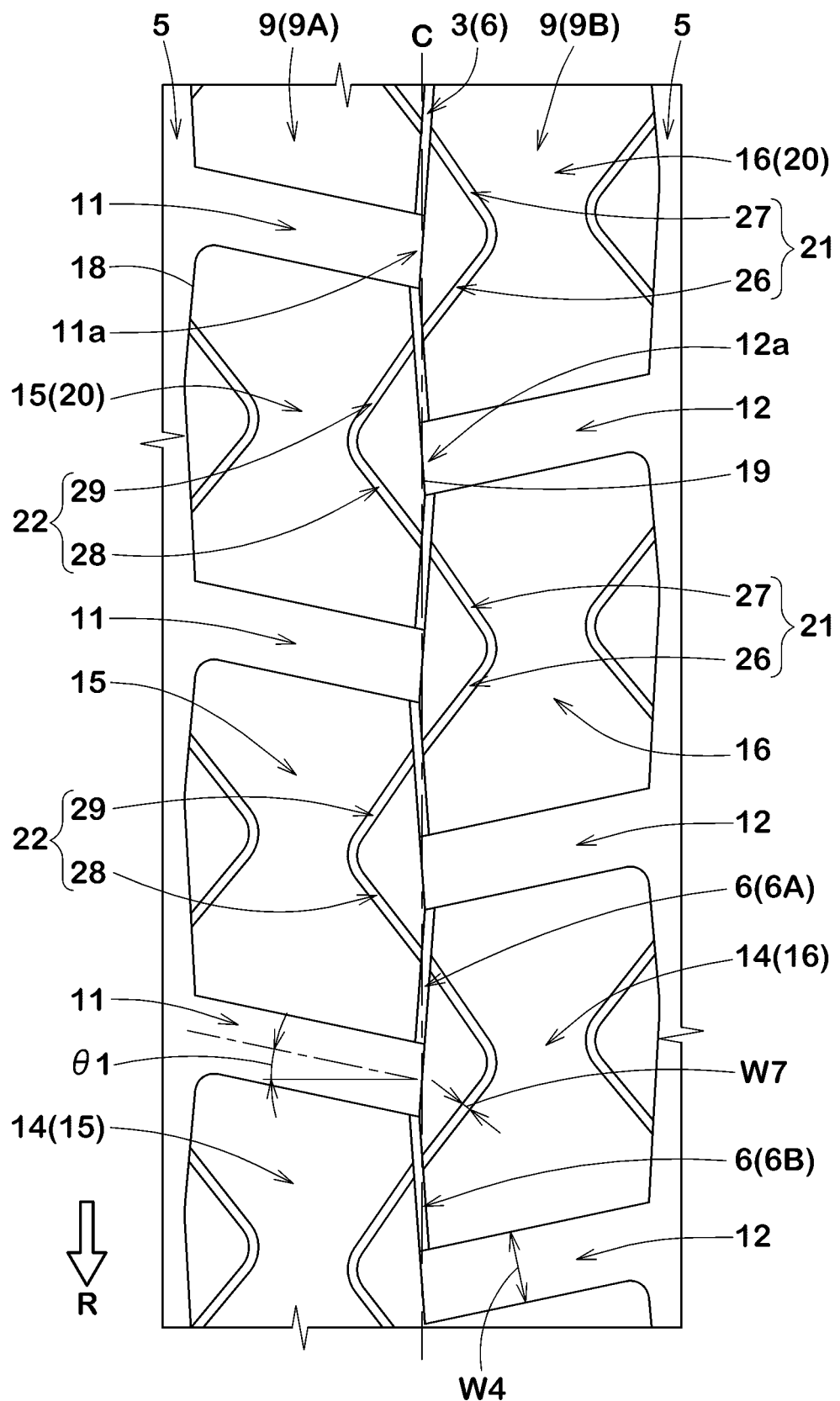
FIG. 2 is an enlarged view of a crown land region of FIG. 1.

FIG. 2 is an enlarged view of the crown land region 9. The crown land region 9 is provided with a plurality of first crown lateral grooves 11 and a plurality of second crown lateral grooves 12. Each of the first crown lateral grooves 11 extends from one of the crown main grooves 5 toward the tire equator C and terminates at least without being connected with the other one of the crown main grooves 5. Each of the second crown lateral grooves 12 extends from the other one of the crown main grooves 5 toward the tire equator C and terminates at least without being connected with the one of the crown main grooves 5. Each of the first crown lateral grooves 11 and the second crown lateral grooves 12 in this embodiment extends to the tire equator C.

An inner end portion 11a on a side of the tire equator C of each of the first crown lateral grooves 11 and an inner end portion 12a on a side of the tire equator C of each of the second crown lateral grooves 12 are misaligned in the tire circumferential direction without being connected with each other, for example. A portion of the crown longitudinal narrow groove 6 connects between one of the inner end portions 11a of the first crown lateral grooves 11 and its adjacent one of the inner end portions 12a of the second crown lateral grooves 12.

It is preferred that each of the first crown lateral grooves 11 and the second crown lateral grooves 12 are inclined toward a heel-side in the tire rotational direction R from one of the tread edges Te to the tire equator C, for example. It is preferred that an angle θ1 of each of the crown lateral grooves 11 and 12 with respect to the tire axial direction is in a range of from 10 to 20 degrees, for example.

It is preferred that each of the crown lateral grooves 11 and 12 has a groove width W4 greater than those of the shoulder main grooves 4 and the crown main grooves 5, for example. Specifically, it is preferred that the groove width W4 of each of the crown lateral grooves 11 and 12 is in a range of from 4.0% to 6.0% of the tread width TW (shown in FIG. 1 and the same applies hereinafter), for example. It is preferred that each of the first crown lateral grooves 11 and the second crown lateral grooves 12 has a groove depth in a range of from 20 to 25 mm, for example.

The crown land region 9 is configured as block rows in which crown blocks 14 are arranged in the tire circumferential direction, for example. The crown land region 9 in this embodiment includes the crown longitudinal narrow groove 6 and a first crown block row 9A and a second crown block row 9B divided by the lateral grooves 11 and 12, for example. In the first crown block row 9A, a plurality of first crown blocks 15 divided by the plurality of the first crown lateral grooves 11 are arranged in the tire circumferential direction. In the second crown block row 9B, a plurality of second crown blocks 16 divided by the plurality of the second crown lateral grooves 12 are arranged in the tire circumferential direction. The first crown blocks 15 and the second crown blocks 16 are arranged adjacently to each other, one by one, in the tire axial direction with the crown longitudinal narrow groove 6 therebetween.

As described above, in the tread portion 2 in this embodiment, at least one of the land regions is configured as a block row, therefore, it is provided with a plurality of blocks. Each of the blocks has a ground contacting surface between a first longitudinal edge 18 and a second longitudinal edge 19 extending in the tire circumferential direction.

Figure 3:
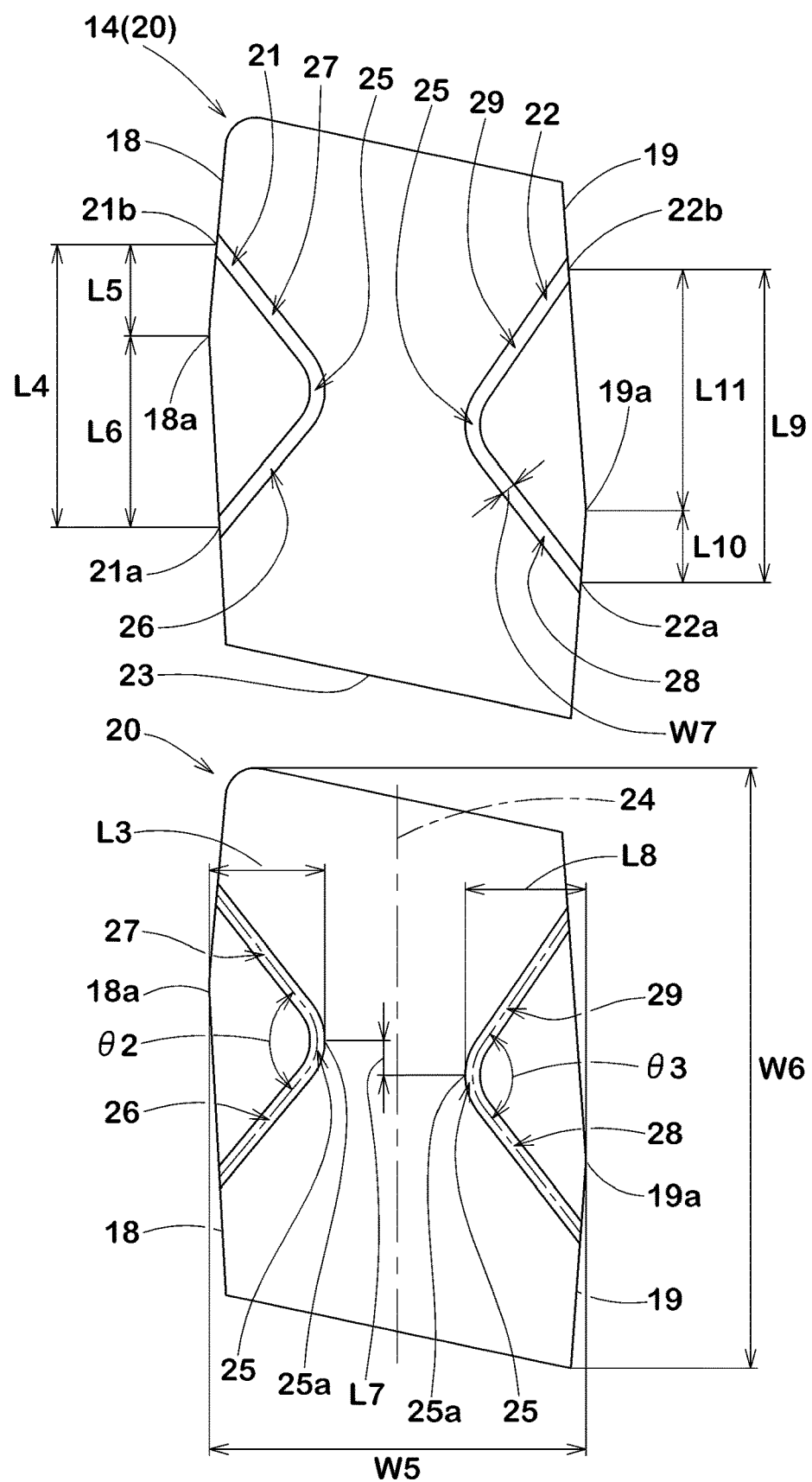
FIG. 3 is an enlarged view of one of crown blocks of FIG. 2.

FIG. 3 is an enlarged view of the crown blocks 14 as an example of the blocks. As shown in FIG. 3, the blocks include first blocks 20 each having a first narrow groove 21 provided in a ground contacting surface thereof. It is preferred that each of the first blocks 20 has the hexagonal ground contacting surface, for example. Thereby, the first longitudinal edge 18 of each of the first blocks 20 in this embodiment has a first vertex 18a that is convex toward the outside of the first block 20. The second longitudinal edge 19 has a second vertex 19a that is convex toward the outside of the first block 20.

The first narrow groove 21 extends from a first end 21a on the first longitudinal edge 18 toward a center 24 in the tire axial direction of the first block 20. Further, the first narrow groove 21 curves within the ground contacting surface of the first block 20 and reaches a second end 21b on the first longitudinal edge 18. Thereby, the first narrow groove 21 extends in a laterally oriented V-shape.

When the ground contacting surface of the first block 20 having the first narrow groove 21 contacts a wet road surface, it is possible to guide the water on the road surface toward the first longitudinal edge 18 by the first narrow groove 21. Further, the first narrow groove 21 can increase frictional force on a wet road surface by edges thereof. Therefore, it is possible that excellent wet performance is obtained.

Furthermore, when shearing force in the tire circumferential direction is applied to the first block 20, the first block 20 can be elastically deformed so that a region divided by the first longitudinal edge 18 and the first narrow groove 21 moves toward outside of the block. Such elastic deformation of the first block 20 can moderate the ground contact pressure applied to a lateral edge 23 extending in the tire axial direction, therefore, it is possible to effectively suppress the heal and toe wear which is the uneven wear of the block.

The first narrow groove 21 includes a first inclined element 26 and a second inclined element 27, for example. The first inclined element 26 extends from the first end 21a toward the center 24 and is inclined with respect to the tire axial direction, for example. The second inclined element 27 extends from the second end 21b and is inclined in a direction opposite to the first inclined element 26. The first inclined element 26 and the second inclined element 27 are inclined in such a direction that a distance between them in the tire circumferential direction gradually decreases towards the center 24. The first narrow groove 21 further includes an apex portion 25 smoothly connecting the first inclined element 26 and the second inclined element 27. The first block 20 having the first narrow groove 21 configured as such can further moderate the ground contact pressure applied to the lateral edge 23.

It is preferred that each of the first inclined element 26 and the second inclined element 27 extends straight. An angle θ2 between the first inclined element 26 and the second inclined element 27 is preferably not less than 70 degrees, more preferably not less than 80 degrees, and preferably not more than 140 degrees, more preferably not more than 130 degrees. The first narrow groove 21 configured as such can moderate the ground contact pressure applied to the lateral edge 23 while suppressing the uneven wear of a center portion of the block.

In order to further suppress the uneven wear in the center portion of the block, it is preferred that the apex portion 25 is provided between the first longitudinal edge 18 and the center 24, for example. In other words, the first narrow groove 21 is curved before the center 24.

It is preferred that a distance L3 in the tire axial direction between the first vertex 18a of the first longitudinal edge 18 and an end 25a of the apex portion 25 on a side of the center 24 is in a range of from 0.10 to 0.40 times a maximum width W5 in the tire axial direction of the first block 20. The first narrow groove 21 configured as such can exert the above-mentioned effects while suppressing excessive decrease in rigidity of the block.

In this embodiment, the first end 21a of the first narrow groove 21 is positioned on one side (lower side in FIG. 3) in the tire circumferential direction of the first vertex 18a of the first longitudinal edge 18. Further, the second end 21b of the first narrow groove 21 is positioned on the other side (the upper side in FIG. 3) in the tire circumferential direction of the first vertex 18a of the first longitudinal edge 18. In other words, the first vertex 18a of the first longitudinal edge 18 is provided between the first end 21a and the second end 21b.

It is preferred that a minimum distance L5 in the tire circumferential direction between the first vertex 18a and either end of the first narrow groove 21 (in this embodiment, this distance is the distance between the first vertex 18a and the second end 21b) is not less than 0.25 times a distance L4 in the tire circumferential direction between the first end 21a and the second end 21b, for example. It is preferred that a maximum distance L6 in the tire circumferential direction between the first vertex 18a and either end of the first narrow groove 21 (in this embodiment, this distance is the distance between the first vertex 18a and the first end 21a) is not more than 0.75 times the above distance, for example. Thereby, the first vertex 18a and each end of the first narrow groove 21 are appropriately separated from each other, therefore, the uneven wear of the first longitudinal edge 18 is suppressed.

As a more preferred embodiment, the first block 20 in this embodiment is provided with a second narrow groove 22 on the ground contacting surface on the opposite side of the first narrow groove 21. However, the present invention is not limited to such an embodiment, it is needless to say that the above-described effects can be exerted even when the first block 20 is provided with only one first narrow groove 21, for example.

The second narrow groove 22 extends from a third end 22a on the second longitudinal edge 19 toward the center in the tire axial direction of the first block 20. Further, the second narrow groove 22 curves within the ground contacting surface of the first block 20 and reaches a fourth end 22b on the second longitudinal edge 19. Thereby, the second narrow groove 22 extends in a laterally oriented V-shape.

The second narrow groove 22 configured as such can exert the same function as the first narrow groove. That is, when running on a wet road surface, the second narrow groove 22 guides the water on the road surface toward the second longitudinal edge 19, therefore, it is possible that the wet performance is improved. Further, when the shearing force in the tire circumferential direction is applied to the first block 20, the first block 20 elastically deforms so that a region divided by the second longitudinal edge 19 and the second narrow groove 22 moves toward outside of the block, therefore, it is possible to moderate the ground contact pressure applied to the lateral edge 23 extending in the tire axial direction.

In this embodiment, it is preferred that the first narrow groove 21 and the second narrow groove 22 are arranged so as not to intersect with each other, for example. The first narrow groove 21 and the second narrow groove 22 configured as such can maintain the rigidity of the block moderately.

The second narrow groove 22 includes a third inclined element 28 and a fourth inclined element 29, for example. The third inclined element 28 extends from the third end 22a toward the center 24 and is inclined with respect to the tire axial direction, for example. The fourth inclined element 29 extends from the fourth end 22b and is inclined in a direction opposite to the third inclined element 28. The third inclined element 28 and the fourth inclined element 29 are inclined in such a direction that a distance between them in the tire circumferential direction gradually decreases towards the center 24. The second narrow groove 22 further includes an apex portion 25 smoothly connecting the third inclined element 28 and the fourth inclined element 29.

It is preferred that each of the third inclined element 28 and the fourth inclined element 29 extends straight. An angle θ3 between the third inclined element 28 and the fourth inclined element 29 is preferably not less than 70 degrees, more preferably not less than 80 degrees, and preferably not more than 140 degrees, more preferably not more than 130 degrees. The second narrow groove 22 configured as such can moderate the ground contact pressure applied to the lateral edge 23 while suppressing the uneven wear of the center portion of the block.

In order to further suppress the uneven wear in the center portion of the block, it is preferred that the apex portion 25 is provided between the second longitudinal edge 19 and the center 24, for example. In other words, the second narrow groove 22 is curved before the center 24.

It is preferred that the apex portion 25 of the second narrow groove 22 is provided at a different position from the apex portion 25 of the first narrow groove 21 in the tire circumferential direction. It is preferred that a distance L7 in the tire circumferential direction between the end 25a on a side of the center 24 of the apex portion 25 of the first narrow groove 21 and the end 25a on a side of the center 24 of the apex portion 25 of the second narrow groove 22 is in a range of from 3.0% to 7.0% of a maximum width W6 in the tire circumferential direction of the first block 20, for example. The first narrow groove 21 and the second narrow groove 22 configured as such can moderate the ground contact pressure applied to the lateral edge 23 while suppressing the uneven wear of the center portion of the block.

It is preferred that a distance L8 in the tire axial direction between the second vertex 19a of the second longitudinal edge 19 and the end 25a on a side of the center 24 of the apex portion 25 of the second narrow groove 22 is in a range of from 0.10 to 0.40 times the maximum width W5 in the tire axial direction of the first block 20.

In this embodiment, the third end 22a of the second narrow groove 22 is positioned on one side (lower side in FIG. 3) in the tire circumferential direction of the second vertex 19a of the second longitudinal edge 19. Further, the fourth end 22b of the second narrow groove 22 is positioned on the other side (the upper side in FIG. 3) in the tire circumferential direction of the second vertex 19a of the second longitudinal edge 19. In other words, the second vertex 19a of the second longitudinal edge 19 is provided between the third end 22a and the fourth end 22b.

It is preferred that a minimum distance L10 between the second vertex 19a and either end of the second narrow groove 22 (in this embodiment, this distance is the distance between the second vertex 19a and the third end 22a) is not less than 0.25 times a distance L9 in the tire circumferential direction between the third end 22a and the fourth end 22b, for example. It is preferred that a maximum distance L11 between the second vertex 19a and either end of the second narrow groove 22 (in this embodiment, this distance is the distance between the second vertex 19a and the fourth end 22b) is not more than 0.75 times the above distance, for example. Thereby, the second vertex 19a and each end of the second narrow groove 22 are appropriately separated from each other, therefore, the uneven wear of the second longitudinal edge 19 is suppressed.

As shown in FIG. 2, in order to improve the wet performance and the uneven wear resistance performance in a good balance, it is preferred that each of the first narrow groove 21 and the second narrow groove 22 has a groove width W7 in a range of from 0.5 to 3.0 mm, for example. It is preferred that each of the first narrow groove 21 and the second narrow groove 22 has a groove depth in a range of from 2.5% to 14% of the groove depth of each of the crown main grooves 5, for example. Specifically, it is preferred that the above groove depth is in a range of from 0.5 to 3.5 mm, for example.

In this embodiment, each of the first crown blocks 15 and the second crown blocks 16 are configured as the first block 20, and two first blocks 20 (the first crown block 15 and the second crown block 16) are arranged adjacently to each other in the tire axial direction with one of the circumferential grooves 3 (the crown longitudinal narrow groove 6 in FIG. 2) extending in the tire circumferential direction.

In this embodiment, the second narrow groove 22 of one of the two first blocks 20 (the first crown block 15 in FIG. 2) is arranged so as to be connected with the first narrow groove 21 of the other one of the two first blocks 20 (the second crown block 16 in FIG. 2) with the crown longitudinal narrow groove 6 therebetween. Note that the first narrow groove 21 and the second narrow groove 22 being arranged so as to be connected means that a virtual extension of an end portion of one of the narrow grooves intersects with at least a part of an end portion of the other one of the narrow grooves. In a preferred embodiment, a virtual extension of the end portion of one of the narrow grooves overlaps with the other one of the narrow grooves in not less than half of the groove width thereof. In a further preferred embodiment, in this embodiment, in each pair of the first and the second narrow grooves, one of the edges of one of the narrow grooves and one of the edges of the other one of the narrow grooves are arranged on the same straight line.

Owing to such arrangement of the first blocks 20, during running on a wet road surface, it becomes easier to guide the water in each of the narrow grooves 21 and 22 to toe-side in the tire rotational direction R. Therefore, excellent wet performance is exerted.

The first crown lateral grooves 11 and the second crown lateral grooves 12 in this embodiment are misaligned in the tire circumferential direction. Thereby, each of the first crown blocks 15 is adjacent to two of the second crown blocks 16. Each of the second crown blocks 16 is adjacent to two of the first crown blocks 15.

In such arrangement of the blocks, the third inclined element 28 of the second narrow groove 22 of each of the first crown blocks 15 is connected with the second inclined element 27 of the first narrow groove 21 of one of the second crown blocks 16 with the crown longitudinal narrow groove 6 therebetween. The fourth inclined element 29 of the second narrow groove 22 of each of the first crown blocks 15 is connected with the first inclined element 26 of the first narrow groove 21 of one of the second crown blocks 16 with the crown longitudinal narrow groove 6 therebetween. Thereby, a zigzag-shaped narrow groove formed by the second narrow grooves 22 of the first crown blocks 15 and the first narrow grooves 21 of the second crown blocks 16 extends continuously in the tire circumferential direction. Such arrangement of the narrow grooves can further increase the above-mentioned effects.

Figure 4:
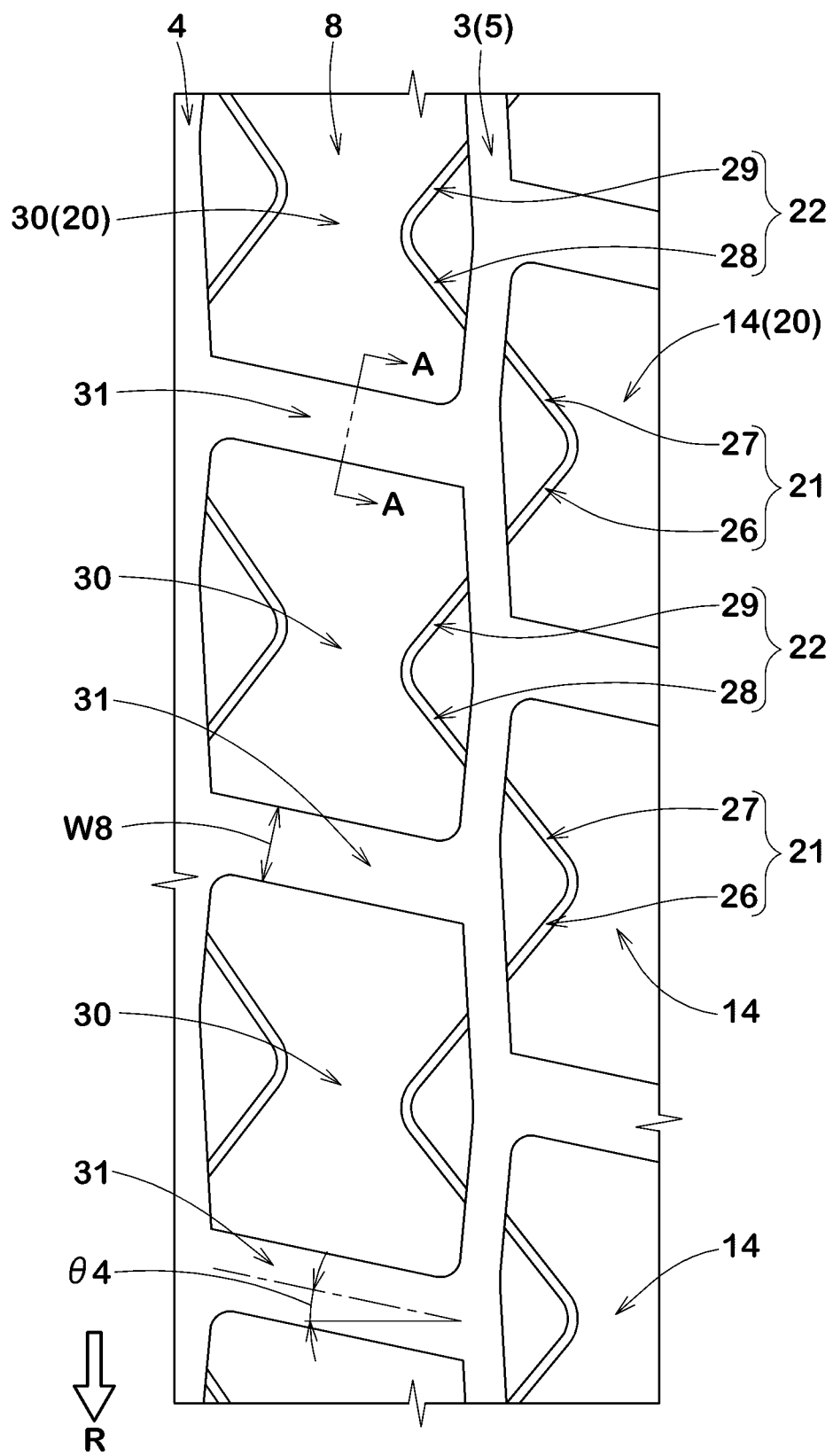
FIG. 4 is an enlarged view of a middle land region of FIG. 1.

FIG. 4 is an enlarged view of one of the middle land regions 8. As shown in FIG. 4, each of the middle land regions 8 is provided with a plurality of middle lateral grooves 31. Each of the middle lateral grooves 31 connects between one of the shoulder main grooves 4 and its adjacent one of the crown main grooves 5, for example. It is preferred that the middle lateral grooves 31 are inclined to the heel-side in the tire rotational direction R from one of the tread edges Te toward the tire equator C, for example. It is preferred that an angle θ4 with respect to the tire axial direction of each of the middle lateral grooves 31 is in a range of from 10 to 20 degrees, for example.

It is preferred that each of the middle lateral grooves 31 has a groove width W8 larger than those of the shoulder main grooves 4 and the crown main grooves 5, for example. Specifically, it is preferred that the groove width W8 of each of the middle lateral grooves 31 is in a range of from 4.0% to 6.0% of the tread width TW, for example. It is preferred that each of the middle lateral grooves 31 has a groove depth in a range of from 20 to 25 mm, for example.

Figure 5:
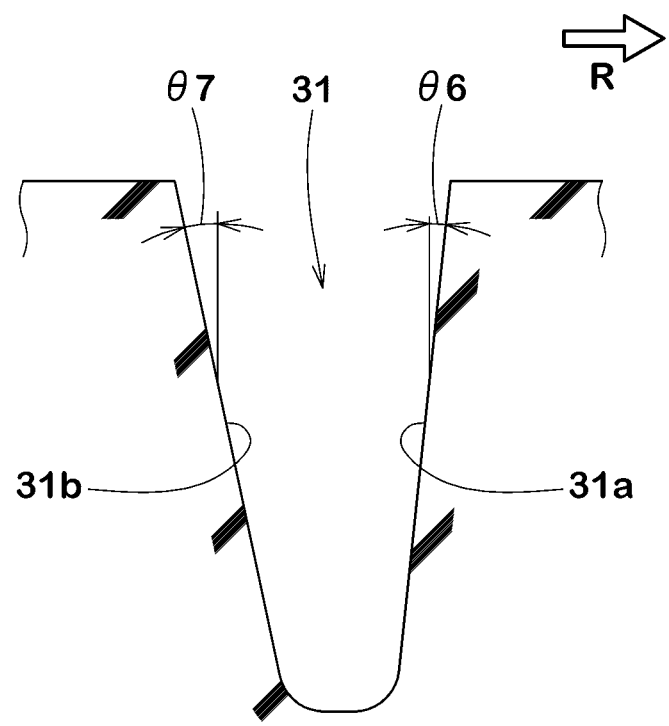
FIG. 5 is a cross-sectional view taken along A-A line of FIG. 4.

FIG. 5 is a cross-sectional view of one of the middle lateral grooves 31 taken along A-A line of FIG. 4. As shown in FIG. 5, it is preferred that each of the middle lateral grooves 31 has a pair of groove walls 31a and 31b having different angles with respect to a tire radial direction, for example. It is preferred that an angle θ6 with respect to the tire radial direction of the groove wall 31a located on the heel-side in the tire rotational direction R of the middle lateral groove 31 is smaller than an angle θ7 with respect to the tire radial direction of the groove wall 31b located on the toe-side in the tire rotational direction R, for example. It is preferred that the angle θ6 is in a range of from 3 to 9 degrees, for example. It is preferred that the angle θ7 is in a range of from 10 to 15 degrees, for example. The middle lateral grooves 31 configured as such are helpful for suppressing the heal and toe wear of the middle land regions 8.

As shown in FIG. 4, each of the middle land regions 8 includes middle blocks 30 divided by the middle lateral grooves 31. The middle blocks 30 are configured as the first blocks 20 in which the first narrow grooves 21 and the second narrow grooves 22 are arranged. In this embodiment, the crown blocks 14 and the middle blocks 30 are configured as the first blocks 20, therefore, the above-described effects are more easily exerted.

In this embodiment, the middle blocks 30 and the crown blocks 14 are configured as the first blocks 20, and the two first blocks 20 are arranged adjacently in the tire axial direction with one of the circumferential grooves 3 extending in the tire circumferential direction (the crown main groove 5 in FIG. 4).

In this embodiment, the second narrow groove 22 of one of the two first blocks 20 (the middle block 30 in FIG. 4) is arranged so as to be connected with the first narrow groove 21 of another one of the two first blocks 20 (the first crown block 15 in FIG. 4) with one of the crown main grooves 5 therebetween.

The first crown lateral grooves 11 and the middle lateral grooves 31 in this embodiment are misaligned in the tire circumferential direction. Thereby, each of the middle blocks 30 is adjacent to two of the crown blocks 14. Each of the crown blocks 14 is adjacent to two of the middle blocks 30.

In the block arrangement configured as such, the third inclined element 28 of the second narrow groove 22 of one of the middle blocks 30 is connected with the second inclined element 27 of the first narrow groove 21 of one of the crown blocks 14 with one of the crown main grooves 5 therebetween. The fourth inclined element 29 of the second narrow groove 22 of one of the middle blocks 30 is connected with the first inclined element 26 of the first narrow groove 21 of one of the crown blocks 14 with one of the crown main grooves 5 therebetween. Such arrangement of the narrow grooves can further improve the wet performance. Note that only the middle land region 8 provided in the first tread portion 2A is shown in FIG. 4, but the middle land region 8 provided in the second tread portion 2B has the same configuration.

Figure 6:
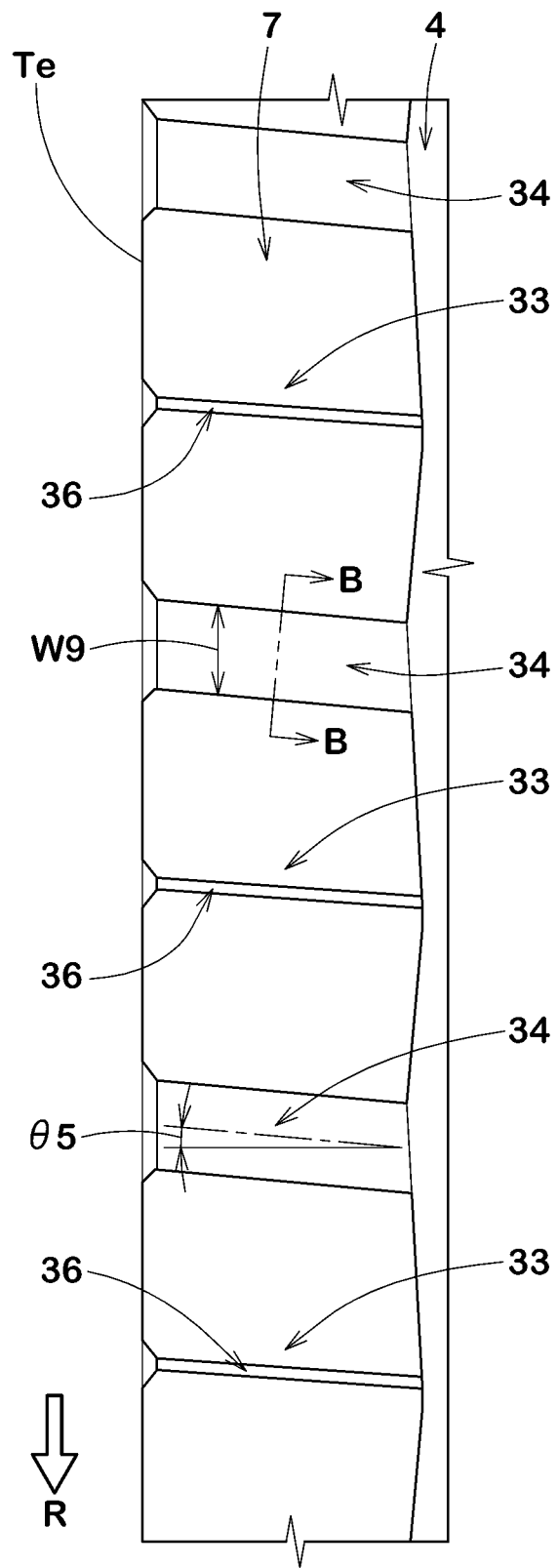
FIG. 6 is an enlarged view of a shoulder land region of FIG. 1.

FIG. 6 is an enlarged view of one of the shoulder land regions 7. As shown in FIG. 6, each of the shoulder land regions 7 is provided with a plurality of shoulder lateral grooves 34. It is preferred that the shoulder lateral grooves 34 are inclined to the heel-side in the tire rotational direction R from one of the tread edges Te toward the tire equator C, for example. It is preferred that an angle θ5 of each of the shoulder lateral grooves 34 with respect to the tire axial direction is in a range of 5 to 10 degrees, for example.

It is preferred that each of the shoulder lateral grooves 34 has a groove width W9 larger than those of the shoulder main grooves 4 and the crown main grooves 5, for example. Specifically, it is preferred that the groove width W9 of each of the shoulder lateral grooves 34 is in a range of from 4.0% to 6.0% of the tread width TW, for example. It is preferred that each of the shoulder lateral grooves 34 has a groove depth smaller than those of the middle lateral grooves 31, for example. It is preferred that the groove depth of each of the shoulder lateral grooves 34 is in a range of from 0.50 to 0.80 times the groove depth of each of the shoulder main grooves 4, for example. More specifically, it is preferred that the groove depth of each of the shoulder lateral grooves 34 is in a range of from 10 to 20 mm, for example.

Figure 7:
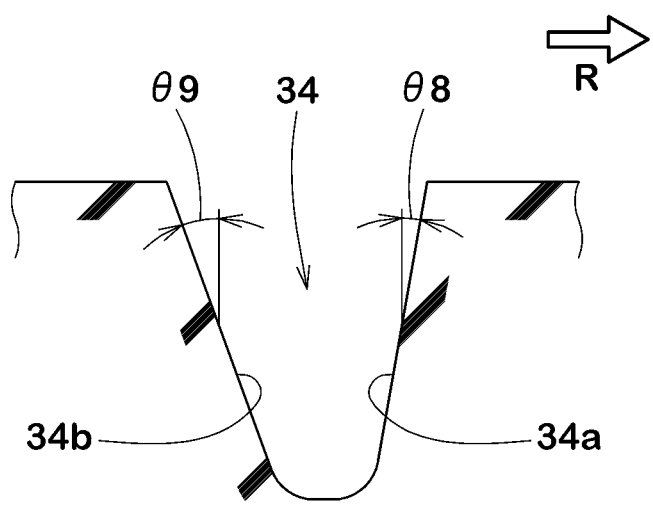
FIG. 7 is a cross-sectional view taken along B-B line of FIG. 6.

FIG. 7 is a cross-sectional view of one of the shoulder lateral grooves 34 taken along B-B line of FIG. 6. As shown in FIG. 7, it is preferred that each of the shoulder lateral grooves 34 has a pair of groove walls 34a and 34b having different angles with respect to the tire radial direction, for example. It is preferred that an angle θ8 with respect to the tire radial direction of the groove wall 34a located on the heel-side in the tire rotational direction R of the shoulder lateral groove 34 is smaller than an angle θ9 with respect to the tire radial direction of the groove wall 34b located on the toe-side in the tire rotational direction R, for example. It is preferred that the angle θ8 is in a range of from 7 to 13 degrees, for example. It is preferred that the angle θ9 is in a range of from 17 to 23 degrees, for example. The shoulder lateral grooves 34 configured as such are helpful for suppressing the heal and toe wear of the shoulder land regions 7.

In a more preferred embodiment, it is preferred that the angle θ8 of the groove wall 34a of the shoulder lateral groove 34 is larger than the angle θ6 with respect to the tire radial direction of the groove wall 31a on the heel-side in the tire rotational direction R of the middle lateral groove 31. It is preferred that the angle θ9 of the groove wall 34b of the shoulder lateral groove 34 is larger than the angle θ7 with respect to the tire radial direction of the groove wall 31b on the toe-side in the tire rotational direction R of the middle lateral groove 31, for example. Thereby, the shoulder land regions 7 and the middle land regions 8 become more likely to wear evenly.

Each of the shoulder land regions 7 includes a plurality of shoulder blocks 33 divided by the plurality of the shoulder lateral grooves 34.

Each of the shoulder blocks 33 is configured as a second block 35 provided with a lateral narrow groove 36 completely crossing the block, for example. It is preferred that the lateral narrow groove 36 has the same groove width and groove depth as those of the first narrow groove 21 and the second narrow groove 22 described above, for example.

Figure 8:
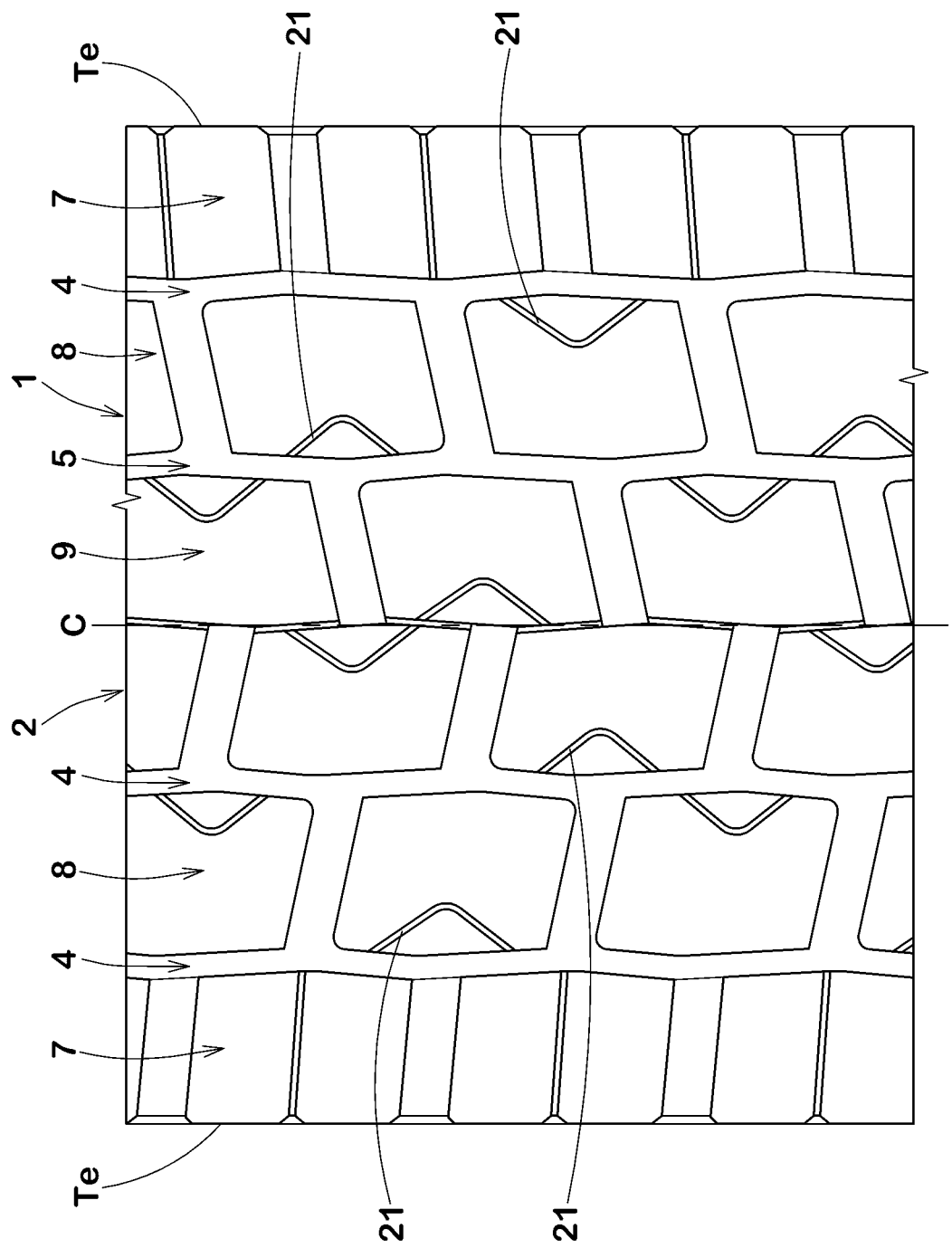
FIG. 8 is a development view of the tread portion of a tire according to another embodiment of the present invention.

FIG. 8 is a development view of the tread portion 2 of the tire 1 according to another embodiment of the present invention. In FIG. 8, the same reference numerals are given to elements common to the above-described embodiment, and the explanation thereof is omitted.

In this embodiment, each of the first blocks 20 is provided with only one narrow groove, that is the first narrow groove 21. In the embodiment configured as such, the rigidity of each of the blocks is maintained, and the steering stability and the uneven wear resistance performance on a dry road surface are improved.

While detailed description has been made of an embodiment of the present invention, the present invention can be embodied in various forms without being limited to the illustrated embodiment.

Working Example (Example)

Figure 9:
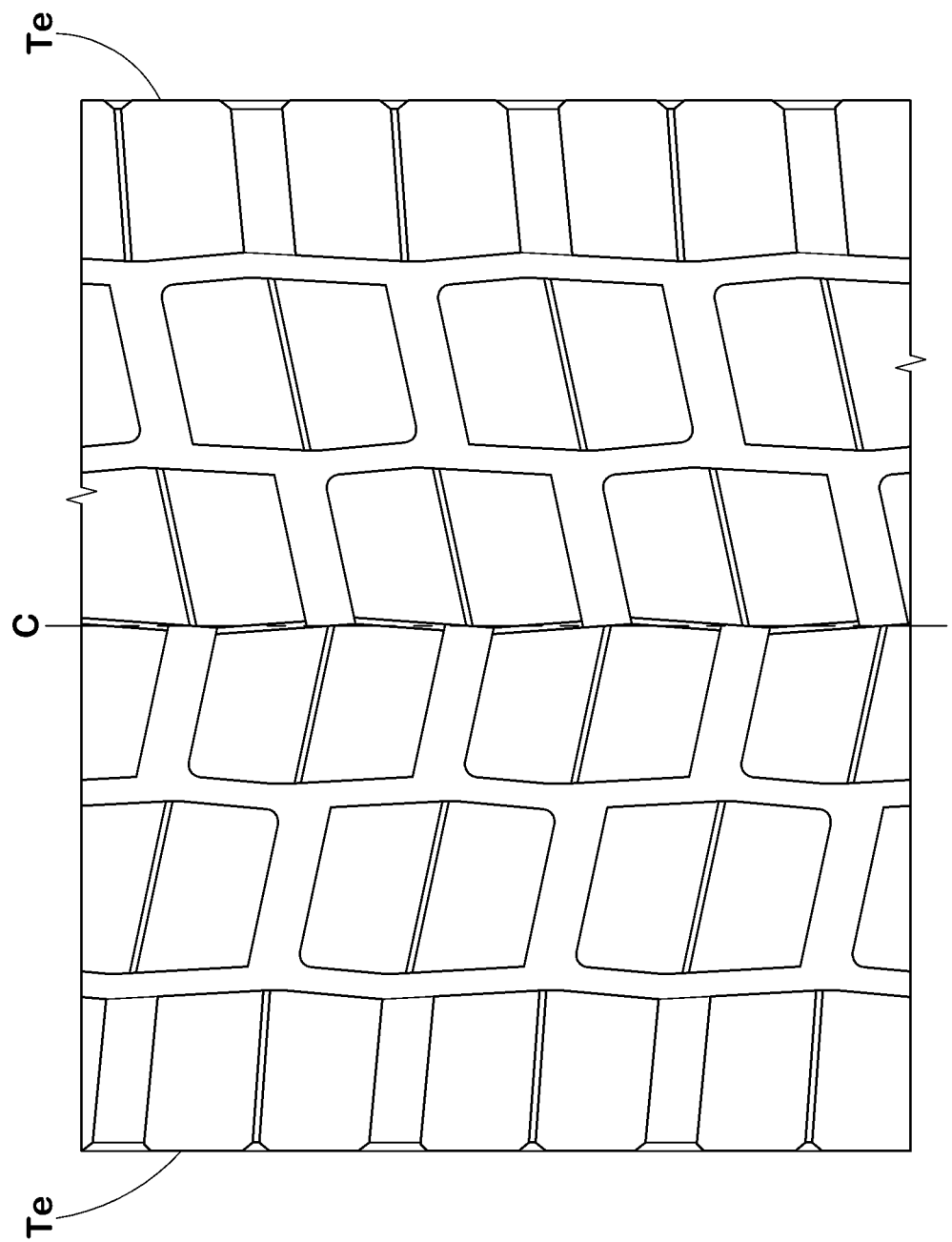
FIG. 9 is a development view of the tread portion of a tire as a reference.

Pneumatic tires for heavy load of size 11R22.5 having the basic tread pattern shown in FIG. 1 or FIG. 8 were made by way of test according to the specifications listed in Table 1. As a reference, as shown in FIG. 9, tires having the tread pattern in which each of the blocks is provided with a lateral narrow groove were made by way of test. Each of the test tires was tested for the wet performance and the uneven wear resistance performance. Common specifications and the test methods are as follows.

Tire rim: 8.25×22.5
Tire inner pressure: 720 kPa
<Wet Performance>
Under the following conditions, the test car underwent a sudden brake while running at a constant speed of 65 km/h on a test road surface. During the sudden brake, time required for the speed of the test car to decrease from 60 km/h to 20 km/h was measured. The test results are indicated by an index based on the measured deceleration time of the reference being 100, wherein the smaller numerical value is better.

Test car: 10-ton truck (2WD-car)
Loading condition: half loaded at front of loading platform
Test tire mounting position: all wheels
Test road surface: asphalt road surface with puddle having depth of 2 mm
<Uneven Wear Resistance Performance>
The test car was driven for a predetermined distance and then the difference in the wear amounts between the lateral edges on one side and the other side of the crown blocks was measured. The test results are indicated by an index based on the difference in the wear amounts of the reference being 100, wherein the smaller the numerical value, the more the uneven wear of the blocks is suppressed.

The test results are shown in Table 1.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Figure showing tread pattern | FIG. 9 | FIG. 1 | FIG. 1 | FIG. 1 | FIG. 1 | FIG. 1 | FIG. 1 | FIG. 1 | FIG. 1 | FIG. 1 |
| Groove width W7 of First narrow groove | — | 1.5 | 0.5 | 1.0 | 2.5 | 3.0 | 1.5 | 1.5 | 1.5 | 1.5 |
| Groove depth of First narrow groove | — | 2.0 | 0.5 | 1.0 | 3.0 | 3.5 | 2.0 | 2.0 | 2.0 | 2.0 |
| Angle θ2 between First inclined element and Second inclined element [degree] | — | 110 | 110 | 110 | 110 | 110 | 70 | 80 | 100 | 120 |
| Distance L3 between First vertex and End of Apex portion/Maximum width W5 of First block | — | 0.27 | 0.27 | 0.27 | 0.27 | 0.27 | 0.27 | 0.27 | 0.27 | 0.27 |
| Wet Performance [index] | 100 | 93 | 97 | 95 | 92 | 91 | 97 | 96 | 94 | 93 |
| Uneven Wear Resistance Performance [index] | 100 | 90 | 90 | 90 | 92 | 94 | 88 | 89 | 90 | 90 |

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Figure showing tread pattern | FIG. 1 | FIG. 1 | FIG. 1 | FIG. 1 | FIG. 1 | FIG. 1 | FIG. 1 | FIG. 1 | FIG. 8 |
| Groove width W7 of First narrow groove | 1.5 | 1.5 | 1.5 | 1.5 | 1.5 | 1.5 | 1.5 | 1.5 | 1.5 |
| Groove depth of First narrow groove | 2.0 | 2.0 | 2.0 | 2.0 | 2.0 | 2.0 | 2.0 | 2.0 | 2.0 |
| Angle θ2 between First inclined element and Second inclined element [degree] | 130 | 140 | 110 | 110 | 110 | 110 | 110 | 110 | 110 |
| Distance L3 between First vertex and End of Apex portion/Maximum width W5 of First block | 0.27 | 0.27 | 0.08 | 0.15 | 0.20 | 0.30 | 0.35 | 0.45 | 0.27 |
| Wet Performance [index] | 92 | 92 | 97 | 95 | 93 | 92 | 91 | 90 | 95 |
| Uneven Wear Resistance Performance [index] | 94 | 95 | 95 | 92 | 90 | 91 | 93 | 94 | 94 |

From the test results, it was confirmed that the wet performance and the uneven wear resistance performance of the tires as the examples were improved.

The invention claimed is:

1. A tire comprising:
a tread portion comprising a plurality of blocks, wherein each of blocks comprises
a first longitudinal edge and a second longitudinal edge extending in a tire circumferential direction,
a pair of lateral edges extending in a tire axial direction connecting the first longitudinal edge to the second longitudinal edge on both sides in the tire circumferential direction of the first longitudinal edge and the second longitudinal edge, and
a ground contacting surface defined among the first longitudinal edge, the second longitudinal edge and the pair of lateral edges,
the blocks include a first block having a first narrow groove and a second narrow groove each provided in the ground contacting surface thereof,
the first narrow groove extends from a first end on the first longitudinal edge toward a center in the tire axial direction of the first block and curves within the ground contacting surface and reaches a second end on the first longitudinal edge so as to extend in a laterally oriented V-shape,
the second narrow groove extends from a third end on the second longitudinal edge toward the center in the tire axial direction of the first block and curves within the ground contacting surface and reaches a fourth end on the second longitudinal edge so as to extend in the laterally oriented V-shape,
the first narrow groove and the second narrow groove are arranged so as not to intersect with each other, and
the first block is provided with only the first narrow groove and the second narrow groove.

2. The tire according to claim 1, wherein each of the first narrow groove and the second narrow groove is curved before the center.

3. The tire according to claim 2, wherein
the first narrow groove includes
a first inclined element extending from the first end toward the center and being inclined with respect to the tire axial direction,
a second inclined element extending from the second end and being inclined in a direction opposite to the first inclined element, and
an apex portion smoothly connecting between the first inclined element and the second inclined element.

4. The tire according to claim 1, wherein
the first narrow groove includes
a first inclined element extending from the first end toward the center and being inclined with respect to the tire axial direction,
a second inclined element extending from the second end and being inclined in a direction opposite to the first inclined element, and
an apex portion smoothly connecting between the first inclined element and the second inclined element.

5. The tire according to claim 4, wherein each of the first inclined element and the second inclined element extends straight.

6. The tire according to claim 1, wherein
the first longitudinal edge has a first vertex convex toward the outside of the first block, and
the first vertex is provided between the first end and the second end.

7. The tire according to claim 6, wherein
the first narrow groove includes a first inclined element extending from the first end toward the center and being inclined with respect to the tire axial direction, a second inclined element extending from the second end and being inclined in a direction opposite to the first inclined element, and an apex portion smoothly connecting between the first inclined element and the second inclined element, and
a distance L3 in the tire axial direction between the first vertex of the first longitudinal edge and an end of the apex portion on a side of the center is in a range of from 0.10 to 0.40 times a maximum width W5 in the tire axial direction of the first block.

8. The tire according to claim 1, wherein
the second narrow groove includes
a third inclined element extending from the third end toward the center and being inclined with respect to the tire axial direction,
a fourth inclined element extending from the fourth end and being inclined in a direction opposite to the third inclined element, and
an apex portion smoothly connecting between the third inclined element and the fourth inclined element.

9. The tire according to claim 8, wherein each of the third inclined element and the fourth inclined element extends straight.

10. The tire according to claim 1, wherein
the second longitudinal edge has a second vertex convex toward the outside of the first block, and
the second vertex is provided between the third end and the fourth end.

11. The tire according to claim 1, wherein
each of the first narrow groove and the second narrow groove has an apex portion at a part thereof closest to the center, and
the apex portion of the second narrow groove is provided at a different position in the tire circumferential direction from the apex portion of the first narrow groove.

12. The tire according to claim 1, wherein
the blocks include at least two first blocks arranged adjacently to each other in the tire axial direction with a circumferential groove extending in the tire circumferential direction therebetween, and
the second narrow groove of one of the two first blocks is arranged so as to be connected with the first narrow groove of the other one of the two first blocks with the circumferential groove therebetween such that a virtual extension of an end portion of one of the narrow grooves intersects with at least a part of an end portion of the other one of the narrow grooves.

13. The tire according to claim 12, wherein the first blocks are crown blocks.

14. The tire according to claim 13, wherein the circumferential groove includes a first groove portion and a second groove portion having different groove depths.

15. The tire according to claim 12, wherein the circumferential groove is a crown longitudinal narrow groove having a groove width W3 in a range of 1.0 to 3.0 mm and a groove depth in a range of from 20 to 25 mm.

16. The tire according to claim 15, wherein the crown longitudinal narrow groove comprises first crown longitudinal narrow groove portions and second crown longitudinal narrow groove portions which are inclined in opposite directions to each other with respect to the tire circumferential direction.

17. The tire according to claim 1, wherein a groove width of the first narrow groove is in a range of from 0.5 to 3.0 mm.

18. The tire according to claim 1, wherein a groove depth of the first narrow groove is in a range of from 0.5 to 3.5 mm.

* * * * *